United States Patent
Tennler

(10) Patent No.: US 10,523,152 B2
(45) Date of Patent: Dec. 31, 2019

(54) SOLAR-OPERATED ADJUSTMENT DEVICE FOR A SOLAR INSTALLATION

(71) Applicant: Claus Tennler, Nürnberg (DE)

(72) Inventor: Claus Tennler, Nürnberg (DE)

( * ) Notice: Subject to any disclaimer, the term of this patent is extended or adjusted under 35 U.S.C. 154(b) by 150 days.

(21) Appl. No.: 15/434,938

(22) Filed: Feb. 16, 2017

(65) Prior Publication Data
US 2017/0310274 A1    Oct. 26, 2017

(30) Foreign Application Priority Data
Apr. 20, 2016 (DE) .................. 10 2016 004 642

(51) Int. Cl.
*H02S 20/32* (2014.01)
*F24S 30/428* (2018.01)
*F24S 30/00* (2018.01)

(52) U.S. Cl.
CPC ............ *H02S 20/32* (2014.12); *F24S 30/428* (2018.05); *F24S 2030/115* (2018.05)

(58) Field of Classification Search
CPC .. F24S 30/48; F24S 50/20; F24S 20/70; F24S 2030/115; H02S 20/30; H02S 20/32
USPC ................................................ 136/242–265
See application file for complete search history.

(56) References Cited

U.S. PATENT DOCUMENTS

| | | | |
|---|---|---|---|
| 2014/0034110 A1* | 2/2014 | Yang ....................... | H02S 20/00 136/246 |
| 2015/0226462 A1* | 8/2015 | Tennler ................... | F24S 30/48 126/608 |

FOREIGN PATENT DOCUMENTS

| | | | |
|---|---|---|---|
| DE | 102008050250 A1 * | 4/2010 | ............ F24S 30/425 |
| DE | 102014001743 A1 | 8/2015 | |

* cited by examiner

*Primary Examiner* — Eli S Mekhlin
*Assistant Examiner* — Kourtney R S Carlson
(74) *Attorney, Agent, or Firm* — Flener IP & Business Law; Zareefa B. Flener; Ayhan E. Mertogul

(57) ABSTRACT

Solar-operated adjustment device for a solar installation including, at least one retaining element for fixing at least one solar element, a swivel device which is designed and intended to swivel the retaining element around a support point, wherein the swivel device includes at least one liquid tank, wherein a float of the retaining element is arranged at least in part beneath a filling level of the liquid tank and the float is supported on a perimeter of the liquid tank, and the retaining element can only be swiveled around a support point with respect to a longitudinal axis of the liquid tank by means of its buoyancy and is mounted above the filling level, at least indirectly on the edge of the liquid tank.

12 Claims, 2 Drawing Sheets

SOLAR-OPERATED ADJUSTMENT DEVICE FOR A SOLAR INSTALLATION

The present invention relates to a solar-operated and specifically liquid-based adjustment device for a solar installation according to the preamble of claim 1.

Adjustment devices for solar installations are known in the prior art that make it possible to adjust the position and configuration of a solar installation, particularly a solar element of the solar installation, in a predefinable manner with respect to the position of the sun and/or with respect to the inclination of a roof pitch, for example. To adjust the inclination of the adjustment device and thus adjust the inclination of the solar installation or of the solar element with respect to the position of the sun, for example, an adjustment device known in the prior art comprises a retaining element for fastening at least one solar element and a swivel device which is designed and intended to swivel the retaining element around at least one swivel axis, for example on the roof of a house, by means of electric motors.

Electric motors of this type may, for example, be operated by a control device, thus enabling the retaining element on which a solar element is fixed to be adjusted with as little noise as possible. However, electric motors of this type have the disadvantage, amongst other things, that they are often not only particularly expensive, but also require considerable maintenance and may also be liable to break down, especially as a result of adverse weather conditions. For example, rain, or in other words moisture, may cause a short circuit in the electrical control system of the electric motor. In the prior art, electric motors of this type frequently had to be replaced, which in turn led to a further increase in costs during operation of the adjustment device for the solar installation.

In this respect, an object of the present invention is to provide an alternative swivel mechanism, in particular an alternative swivel device, which makes it possible to operate a solar installation in a particularly stable and cost-effective manner.

This object is achieved by the subject matter of the current claim 1.

In order to specify an adjustment device for a solar installation, and specifically a liquid-based adjustment device, which can be manufactured in a particularly cost-effective manner and can not only be operated cost-effectively but also be manufactured to be particularly stable during operation, the present invention uses the notion, inter alia, that the swivel device comprises at least one liquid tank, wherein a float of the retaining element is arranged at least in part beneath a filling level of the liquid tank and the float is supported on a perimeter of the liquid tank, and the retaining element can only be swivelled around a support point with respect to a longitudinal axis of the liquid tank by means of its buoyancy and is mounted above the filling level, at least indirectly on the edge of the liquid tank, and wherein the filling level of the liquid tank is adjustable in a predefined manner by means of a pipe system for the swivel device, wherein the support point is completely formed by the perimeter of the liquid tank, and wherein the swivel device comprises at least one photovoltaic cell, particularly a solar cell, for producing electrical energy, said cell being arranged on the outer surface of the float, wherein the photovoltaic cell is electrically connected to and/or in data communication with at least one motor, particularly an electric motor, of the adjustment device, and said motor is supplied with energy and/or data, preferably only by the photovoltaic cell, such that the motor causes the float to swivel around this support point.

"At least indirectly" means that at least one swivel device, for example comprising at least one swivel joint, is arranged in a fixed position or such that it can be displaced along the edge in order to move the retaining element with respect to the edge between the retaining element and the edge by swivelling and/or rotation. If a swivel device is arranged between the retaining element and the edge of the liquid tank, the edge and the retaining element are not in direct contact but merely in indirect contact with each other.

The float and/or the retaining element may be formed at least in places by a material that is at least partially permeable to visible light. For example, an outer surface of the float and of the retaining element may be formed with at least part of the outer surface made from said material that is at least partially permeable. For example, this partial surface may be made from a material that is transparent for visible light, which is at least 80%, or preferably over 90%, permeable by this light.

It is conceivable that, by integrating at least a partial surface made from such a light-permeable material, it can be ensured that the solar cell will never be shaded by the retaining plate and/or the float irrespective of the position of the sun or the orientation of the retaining plate, but that sufficient light and/or sufficient light intensity will always be incident on the solar cell.

However, if such an additional swivel device is not used, the retaining element may be in direct contact with the edge of the liquid tank and lie directly on said tank. The retaining element and the edge of the liquid tank are then in direct contact with each other.

In this respect, the term "liquid-based adjustment device" refers to an adjustment device based on a liquid principle for direct adjustment and setting. The use of electric motors for direct adjustment purposes can therefore be advantageously completely avoided. This means that the present adjustment device can be free from electric motor drives, especially purely electrical drives.

In particular, the float is specifically mounted on one side of the retaining element opposite the solar element, i.e. on the underside thereof. The float and the solar element are therefore mounted on opposite surfaces of the retaining element. In other words, an arrangement of this type ensures that an assembly plane on which the solar element is mounted covers a predefinable angle of less than 90° with respect to a longitudinal axis of the liquid tank. The smaller the angle between a main extension plane of the retaining element and the longitudinal axis of the liquid tank, the greater the inclination of the retaining element and thus the inclination of the solar element with respect to the longitudinal axis of the liquid tank.

In other words, the float therefore protrudes from the solar element and into the liquid tank itself. The float therefore lies obliquely directly on the edge of the liquid tank and is supported by this edge of the liquid tank. In this respect, the edge of the liquid tank preferably represents a guide curve for the retaining element itself. In particular, the edge may also define and fix the above-described swivel axis of the retaining element. For example, the float may be able to be rolled in the circumferential direction of the perimeter, in other words along the edge of the liquid tank, preferably without slipping.

For example, the liquid tank is mounted statically such that the longitudinal axis of the liquid tank remains unchanged even during operation. However, alternatively, it is conceivable that the orientation of the liquid tank can also be adjusted with respect to the retaining element and/or an assembly plane of the liquid tank, for example as a function of the position of the sun. To this end, a damper and/or an electric motor and/or another mechanical component may, for example, be installed on the bottom of the liquid tank in order to change the orientation of the liquid tank.

The liquid tank may in particular comprise such a spatial physical element, which is distinct from a volume of water and water receptacle, such as a pond or a lake, for example. To this end, the liquid tank may be a self-supporting and free-standing stable element which forms an inner volume. The liquid tank may in particular be in the form of a liquid drum. The liquid tank may be portable.

With regard to the pipe system, it should be pointed out that, in order to change the filling level in the liquid tank, the pipe system is designed with at least one liquid supply pipe which leads into the liquid tank and with at least one liquid discharge pipe which leads away from the liquid tank. In particular, the filling level can be changed especially quickly, simply and without mechanical and/or electrical elements precisely by such a direct configuration of the pipe system on the liquid tank by admitting and/or discharging liquid.

With regard to connecting the photovoltaic cell and the motor by an electrical connection and/or by data communication, it should be pointed out that the photovoltaic cell may, for example, supply a radio station with electrical energy. To this end it is conceivable that this radio station may also be installed on the outer surface of the float or alternatively in a dry inner volume of the float, for example.

The radio station is in turn connected to the motor, preferably by wireless radio data communication, wherein the motor may have its own energy supply. Alternatively, it is also conceivable that the motor may also be supplied by this photovoltaic cell.

If the connection between the photovoltaic cell and the motor is an electrical connection, it is conceivable that the motor may be connected to the photovoltaic cell by a wire.

A support point for the retaining element is therefore defined as a contact point for the float on the edge of the liquid tank. The float and thus also the retaining element can therefore be swivelled around this swivel point (or around this swivel axis) with respect to the lateral direction of the liquid tank.

If the retaining element is not only swivelled, but simultaneously rotated around an axis of rotation of the float which is preferably designed such that it rotates symmetrically around the axis of rotation, such a swivel point for the retaining element is thus always maintained exactly on the edge of the liquid tank, but moves in line with the rotational motion of the float of the retaining element with the float having a contact point on the edge of the liquid tank. In other words, a contact point of the float on the edge of the liquid tank and a swivel point for the float (and thus a swivel point for the retaining element) are always identical.

A further critical advantage of the system described herein is that the configuration of the photovoltaic cells on (or also on top of or in) the float, but preferably on the outer surface of the float, means that the motor is only controlled and/or supplied with electrical energy if sufficient light falls on the photovoltaic cell.

To this end, the adjustment device and, in particular, the motor itself may comprise a test device which checks whether sufficient light is reaching the photovoltaic cell in terms of lumens. If said device establishes that the photovoltaic cell has sufficient light radiation, the motor can be activated by the test device so that the motor can swivel the float around the support point. This can ensure that the main extension direction of the float always follows the position of the sun.

Alternatively, the device may also be operated without such a test device. In this case, it is conceivable that the motor itself may only start to operate when a signal is generated by the radio station, which is sufficiently powerful or modulated accordingly. It is also conceivable that the motor itself may require a limit signal before it can start operating at all.

The motor will thus operate as long as the photovoltaic cell generates sufficient electricity as a result of the incident light. The float therefore moves around the support point as the light source moves provided that the light level does not fall below a certain number of lumens. The light level may in particular fall below the specified number of lumens if the photovoltaic cell is overshadowed, for example by the float or the solar cell fitted to said float itself. In this case, the motor switches itself off, preferably fully automatically. It is not therefore necessary to provide a separate controller and/or control system for the motor in relation to this movement, especially if this limit is not reached.

According to at least one embodiment, the swivel device, especially with respect to the swivel motion around the support point, does not have any controller and/or programming units to operate the motor, which means that the motor is operated solely by light radiation, preferably solely by solar radiation. This may mean that the proposed device can be operated without any programming and is thus self-regulating.

According to at least one embodiment, the liquid-based adjustment device for a solar installation comprises at least one retaining element for fastening at least one solar element, and a swivel device, which is designed and intended to swivel the retaining element around a support point.

According to the invention, the swivel device comprises at least one liquid tank, wherein a float of the retaining element is arranged at least in part beneath a filling level of the liquid tank and the float is supported on a perimeter of the liquid tank, and the retaining element can only be swivelled around a support point with respect to a longitudinal axis of the liquid tank by means of its buoyancy and is mounted above the filling level, at least indirectly on the edge of the liquid tank, wherein the filling level of the liquid tank is adjustable in a predefined manner by means of a pipe system from the swivel device, wherein the support point is completely formed by the perimeter of the liquid tank, and wherein the swivel device comprises at least one photovoltaic cell, particularly a solar cell, for producing electrical energy, said cell being arranged on the outer surface of the float, wherein the photovoltaic cell is electrically connected to and/or in data communication with at least one motor, particularly an electric motor, of the adjustment device, and said motor is supplied with energy and/or data, preferably only by the photovoltaic cell, such that the motor causes the float to swivel around this support point.

According to at least one embodiment, the photovoltaic cell is arranged on the float independently of the filling level such that the photovoltaic cell is always above the filling level.

In this embodiment, the photovoltaic cell is therefore protected from humidity due to the liquid contained in the liquid tank. In addition, the proportion of light falling directly on the photovoltaic cell can be maximised in a particularly simple manner as a result. However, alternatively, it is also conceivable that the photovoltaic cell, independently of the filling level, for example, may always be arranged beneath the filling level, independently of any inclination and/or position of the float with respect to the liquid tank, for example.

According to at least one embodiment, the support point can be fixed in position by at least one fixing means along the edge. Whilst it is usually desirable to ensure that the support point does not roll to and fro on or along the edge of the liquid tank during operation of the device, the fixed position of the support point along the edge of the liquid tank can be predefined by means of this fixing element before the device becomes operational. In this case, the fixing element may be designed as a fixing clamp or fixing joint. The fixing element may be able to be removed from the retaining element and/or liquid tank for this purpose.

It is furthermore conceivable that the fixing element may also be electrically operated. It is therefore feasible for the fixing element positioned on the edge of the liquid tank to be in data communication with the photovoltaic cell. The fixing element may conceivably also or alternatively be driven by the photovoltaic cell. The fixing element drive can therefore be supplied by the photovoltaic cell.

According to at least one embodiment, a displacement means, particularly a displacement cable and/or a displacement wire, for the swivel device is fastened to the float above the support point and preferably also outside the liquid tank, wherein a first end of the displacement means is connected to a height-adjustable auxiliary float, preferably adjustable in the vertical direction, and a second end of the displacement means is connected to a counterweight such that the counterweight is displaced in the opposite direction when the height of the float is adjusted, thus simultaneously causing the float to swivel around the support point. Therefore, in other words, if the auxiliary float moves upwards, the counterweight moves downwards and vice versa.

This therefore results in a movement of the displacement means. As a result of the auxiliary float and/or solar installation being mechanically connected to the displacement means above and preferably also outside the liquid tank, for example by means of just one connection point, a movement of the displacement means is therefore transmitted to a swivel movement of the entire float around the support point. This thus ensures that the float, and in particular the solar installation mounted on said float, swivels in a particularly robust and simple manner.

According to at least one embodiment, in order to adjust the height of the auxiliary float on a preferably continuous basis (vertical movement), said float is floated in a float tank in which the auxiliary float can be filled with a fluid, especially water, by means of a fluid pipe such that said auxiliary float moves upwards and downwards in a vertical direction in the float tank depending on the filling level of the auxiliary float. The filling level of the float tank can thus be adjusted by means of the fluid pipe. At least one guide element can be arranged inside the float tank along which this height movement can be guided.

According to at least one embodiment, the fluid pipe, which leads into the auxiliary float, is connected at the other end to a fluid tank outside the float tank, the fluid being able to be pumped through the fluid pipe, from the fluid tank, into the float tank, by means of the motor of the swivel device.

According to at least one embodiment, the adjustment device comprises a defrosting and/or snow removal system which is designed and intended to remove frost and/or snow from at least one outer surface of the float and/or solar installation. To this end, the defrosting and/or snow removal system may comprise a nozzle system, the nozzles being directed onto an outer surface of the solar installation by means of a control device such that the nozzles discharge a defrosting agent onto the outer surface of the solar installation.

According to at least one embodiment, the swivel device comprises at least one liquid pump, by means of which the liquid level in the liquid tank can be adjusted by supplying and discharging liquid via an additional fluid pipe.

According to at least one embodiment, the photovoltaic cell is also electrically connected to and/or in data communication with the liquid pump. In this respect it is conceivable that the liquid pump for the liquid tank may also be electrically connected to and/or in data communication with the photovoltaic cell.

For example, the float can be adjusted to swivel around the support point by adjusting the height of the auxiliary float, on the one hand, and by directly adjusting the filling level in the liquid tank itself, on the other hand. In other words, the orientation of the float can be adjusted by the two above-mentioned swivel mechanisms either in isolation or in combination with each other. For example, this liquid pump also operates fully automatically, as does the pump for the float tank, and therefore likewise does not have any controller and/or programming units to operate this liquid pump, for example. It is conceivable that the liquid pump can also be electrically operated by the photovoltaic cell.

According to at least one embodiment, the float and/or the auxiliary float is/are designed in the form of a hollow body, and in particular a cylindrical hollow body. For example, at least one weighting means may be fitted inside the float. The weighting means may be a solid weight element. However, it is also conceivable that the weighting means may be a liquid, for example water, once again, which can be poured into the respective cavities. It is therefore particularly advantageous that the weight and also the buoyancy of the float and/or the buoyancy elements can be adjusted particularly on an individual basis.

According to at least one embodiment, at least one additional photovoltaic cell, in particular a solar cell, is arranged inside the float, said cell being connected to the motor and/or to the liquid pumps in the same way as the photovoltaic cell.

According to at least one embodiment, a Fresnel lens is connected upstream of the at least one photovoltaic cell in the direction of the incident radiation. This leads to improved efficiency and focuses the incident light on the photovoltaic cell.

According to at least one embodiment, the solar installation and/or the photovoltaic cell comprises at least one electrolysis element which is designed and intended to perform electrolysis in the solar installation and/or the photovoltaic cell itself. For example, the electrolysis elements are designed in the form of compact individual modules. It is also conceivable that the electrolysis elements are incorporated in interspaces inside the solar installation, said interspaces forming spaces between the individual solar cells. In other words, the electrolysis process can be performed entirely in the solar installation and/or the photovoltaic system. In addition, the solar installation and/or the photovoltaic cell may comprise a switching device by means of which an operator can choose between supplying energy and/or data to the pumps and carrying out electrolysis. It is also possible to perform both of these operations at the same time.

Electrolysis is a process in which an electric current gives rise to a redox reaction. It is, for example, used to extract metals, or to manufacture substances which would be more expensive or virtually impossible to extract by purely chemical processes. Examples of major electrolysis operations include extracting hydrogen, aluminium, chlorine and sodium hydroxide.

Electrolysis requires a DC voltage source, which provides the electrical energy and drives the chemical reactions. Some of the electrical energy is converted to chemical energy. Batteries, accumulators (rechargeable batteries) or fuel cells serve the exact opposite purpose of converting chemical energy into electrical energy: they act as a voltage source. When an accumulator is charged, this is an electrolysis operation which reverses the chemical processes occurring during the discharge process. Electrolysis reactions can therefore be used for energy storage, for example in the electrolysis of water, leading to hydrogen and oxygen, which have been proposed as energy sources in a hydrogen economy. By reversing the electrolysis of water in a fuel cell, it is possible to recover approximately 40% of the original energy.

Separating metals from a solution containing the corresponding metal ions by applying an external current is also referred to as electrolysis. This can be used to produce metal layers, for example in chrome plating; this type of electrolysis reaction is used in electroplating technology. Electrolytic dissolution and re-separation of metals is used to clean copper, for example, and is known as electrolytic refining.

Electrons are transferred in the chemical reactions in which electrolysis takes place. These therefore always entail redox reactions in which oxidation takes place at the anode (electrical polarity), reduction takes place at the cathode; oxidation and reduction processes are therefore at least partially separated from each other in spatial terms.

In this case, the electrical energy obtained from the solar installation and/or the photovoltaic cell can be used to carry out the electrolysis process. This may mean that the electrolysis process is operated solely using the energy obtained from the solar installation and/or photovoltaic cell (direct voltage and direct current).

For example, such a solar installation and/or such a photovoltaic element does not require bypass seals or transformer devices, since the energy provided by the solar installation and/or the photovoltaic element is already in the energy range suitable for use with electrolysis.

According to at least one embodiment, the device comprises a hail protection device. In other words, if the hail protection device detects by means of corresponding sensors that a hailstorm is imminent, for example, the hail protection device causes the solar installation to swivel to an angular position of less than 10 degrees from the vertical by activating at least one of the pumps. Thus, in such a switching state, a main extension plane extends perpendicular to an assembly plane of the device, for example. The hail hitting the installation from above is thus only able to reach a very small surface projection of the main extension surface of the solar installation, which results in very effective protection from such hailstorms.

According to at least one embodiment, the device comprises a wind protection device. In other words, if the wind protection device detects a strong land wind, the wind protection device causes the solar installation to swivel to an angular position of less than 10 degrees from the horizontal by activating at least one of the pumps. This therefore represents the reverse control scenario to the above hail scenario. To this end, for example, the float is flooded with liquid until the float automatically floats into the horizontal position. The wind can then simply blow horizontally over the surface of the solar installation.

According to at least one embodiment, the swivel device comprises at least one, or preferably at least two additional liquid tanks which are connected to the pipe system such that a respective filling level can also be adjusted in these liquid tanks by means of the pipe system and at least one buoyancy element is arranged and floated in each liquid tank, this buoyancy element being mechanically connected to the retaining element at a contact point by means of a guide rod.

One contact point is preferably clearly assigned to each retaining element, preferably on a one-to-one basis, and in particular to each buoyancy element. The contact point is the fixing point at which the guide rod is fixed to the retaining element itself. In this case the contact point is in each case positioned in a plane perpendicular to the longitudinal axis of the liquid tank outside the liquid tank in which the float is located, in the radial direction, such that the respective contact point forms a lever axis on an imaginary line to the swivel point. In particular, the contact point may not only a point at which the retaining element is pulled in the longitudinal direction, but may also be a fixing point at which pressure forces may be applied.

In other words, if a filling level is raised in the additional liquid tanks, this causes the respective buoyancy elements to rise upwards as a result of buoyancy. This essentially means that pressure forces are applied to the contact point of the retaining element by means of the guide rod and the retaining element is forced upwards and rotates around the edge of the liquid tank. In other words, the retaining element is then pressed upwards so as to reduce an inclination of a main extension plane of the retaining element with respect to the longitudinal axis of the liquid tank. The angle becomes smaller as a result.

As in the case of the above-mentioned liquid tank, in order to adjust the individual liquid levels in the additional liquid tanks, said additional liquid tanks may also comprise at least one liquid supply pipe and one liquid discharge pipe each. In particular, it is conceivable that the individual filling levels for the additional liquid tanks may be connected together by the pipe system in fluid communication. The liquid levels can therefore be connected fluidically to each other both across the additional liquid tanks and also, for example, between the liquid tanks and to each or only one of the additional liquid tanks.

The retaining element is made to rotate around an axis of symmetry of the float, for example, by raising a filling level in one of the additional liquid tanks, for example, and/or reducing a filling level in a liquid tank. As a result of the different filling levels achieved, the buoyancy elements are therefore also moved in different longitudinal directions (of the additional liquid tanks) respectively. The fact that the spacing of preferably every contact point for the buoyancy elements on the plane perpendicular to the longitudinal axis of the liquid tank can be predefined leads to a rotational torque that is caused exclusively by the mutually opposite movements of the two buoyancy elements, for example. This therefore leads to a rotation of the float and its axis of rotation along the edge of the liquid tank.

According to at least one embodiment, the swivel device comprises at least one liquid pump, by means of which the liquid level in the liquid tank and/or a liquid level in at least one of the additional liquid tanks can be adjusted by supplying and discharging liquid via the pipe system. In particular, the individual filling levels of the liquid tanks can be adjusted independently of each other via the pipe system.

It is conceivable that a liquid pump of this type may be installed together with the liquid tank. However, alternatively or in addition, it is also conceivable that the liquid pump may be positioned such that it is spatially separate from the tanks. In other words, it is conceivable that a liquid pump of this type could be located in a boiler room and could still be in fluid communication with at least one of the liquid tanks.

According to at least one embodiment, the adjustment device comprises at least one control device which transmits at least one pump signal to the liquid pump depending on the time of day and/or season. In particular, the control device may comprise a light sensor and/or humidity sensor and/or temperature sensor, according to which an adjustment level of the retaining element and, in particular, the main extension plane of the retaining element can be adjusted via the individual liquid levels in the liquid tank and/or the additional liquid tanks by programming via a control unit (depending on the circumstances this may be a display or other input unit). It is therefore completely unnecessary to add expensive electric motors which are particularly liable to break down. As already mentioned several times above, a core feature of the present invention is that it is merely necessary to change the filling level in order to adjust and, for example, incline the retaining element and, in particular, its main extension plane, with respect to the longitudinal axis of the liquid tank.

According to at least one embodiment, the liquid is water. Using water as the liquid is particularly advantageous because water, for example in a hot water circuit, which is already present in a preferably sealed heating circuit in a house, can be used. It is therefore unnecessary to use a separate pipe system merely to change the individual filling levels. In this respect, the pipe system described here may form part of a sealed pipe circuit or sealed heating circuit. It is also conceivable to prevent the liquid freezing during the cold winter months by incorporating at least one frost protection means in the liquid. Furthermore, it is conceivable that water connections for the pipe system may be connected to a hot water circuit. In this respect, it is possible to prevent the liquid freezing during the cold winter months.

According to at least one embodiment, the float and/or one or each of the buoyancy elements may be designed in the form of a hollow body, wherein at least one weighting means is incorporated in the float and/or in each buoyancy element. The weighting means may be a solid weight element. However, it is also conceivable that the weighting means may be a liquid, for example water, once again, which can be poured into the respective cavities. It is therefore particularly advantageous that the weight and also the buoyancy of the float and/or the buoyancy elements can be adjusted particularly on an individual basis.

The liquid-based adjustment device described herein for a solar installation will be described in greater detail below by means of an embodiment of the invention and the associated drawings, in which.

The elements described herein may not be shown to scale in the drawings, and may be enlarged, in particular. However, it should be noted that like or equivalently-acting components are always referred to using like reference numerals.

Figure 1:
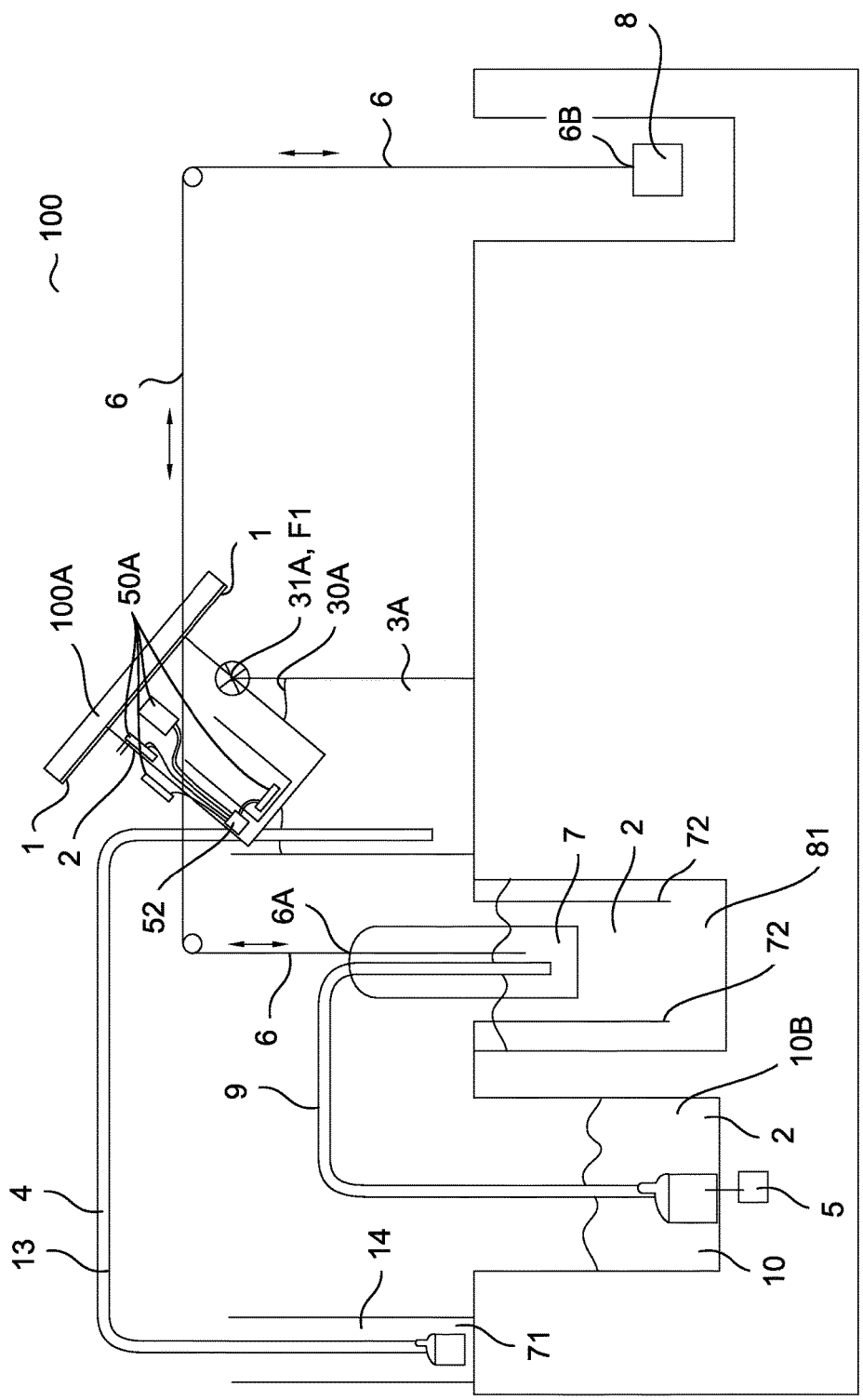
FIG. 1 is a schematic perspective view of an embodiment of the liquid-based solar installation for a solar module as described herein.

FIG. 1A is a schematic perspective view of an embodiment of a liquid-based adjustment device 100 for a solar installation 100A. The liquid-based adjustment device 100 comprises a retaining element 1 for fastening at least one solar element of the solar installation 100A. In this case, the retaining element 1 is designed in the form of a plane and thus forms an assembly plane on which at least one solar element is mounted.

The liquid-based adjustment device 100 also comprises a swivel device 2 which is designed and intended to swivel the retaining element 1 around a swivel axis S around a support point F1. In particular, the main extension plane of the retaining element 1 assumes a predefined angle with respect to a longitudinal axis L of a liquid tank 3A of the swivel device 2. It can also be seen that the retaining element 1 comprises a float 1A, wherein a fixing plane of the retaining element 1 is mechanically and rigidly connected to the float 1A of the retaining element. The fixing plane and the assembly plane are therefore formed on sides of the retaining element 1 that are turned away from each other.

An axis of rotation of the float 1A can be arranged vertically on the main extension plane of the retaining plane of the retaining element 1. In this respect, a main extension plane of the solar element also runs perpendicular to the axis of rotation of the float. In other words, the float 1A of the retaining element 1 extends from the assembly plane and protrudes into an opening in the liquid tank 3A.

It is conceivable that at least one fixing or rolling device may be provided on the fixing plane to prevent the retaining element 1 slipping on an edge 31A of the liquid tank.

The float 1A of the retaining element 1 and the solar element 100A are therefore mounted on different sides of the retaining element 1.

In this case, the float 1A of the retaining element 1 is mounted on an edge 31A of the liquid tank 3A, wherein said float 1A is fixed at a support point F1 on a point on the edge 31A, and said float 1A can simultaneously be swivelled around a swivel point on the edge of the liquid tank 3A. The edge 31A of the liquid tank 3A therefore not only acts as a swivel point for the float 1A and thus for the entire retaining element 1, but can also be designed as a single supporting element for the entire retaining element 1.

In this case, the swivel device 2 comprises at least one photovoltaic cell 50, in particular a solar cell, for producing electrical energy, said cell being arranged on the outer surface of the float 1A, wherein the photovoltaic cell is in data communication with at least one motor 5, especially an electric motor, of the adjustment device 2, said motor 5 thus being supplied, preferably only supplied, by the photovoltaic cell 50, such that the motor 5 causes the float 1A to swivel around this support point F1. For example, the photovoltaic cell is arranged on a surface facing the edge 31A and directly in contact with the edge. This surface may also comprise partial surfaces which run at an angle to or are bent with respect to one another.

In order to cause the float 1A to swivel, a displacement cable is arranged on the float 1A, said cable engaging with the float 1A preferably at only one point above the filling level. This thus creates a mechanical lever due to the distance between this engagement point and the support for the float 1A on the edge 31A of the liquid tank 3A. The displacement cable is connected by its first end 6A to a height-adjustable (preferably in the vertical direction) auxiliary float 7, and a second end 6B of the displacement means 6 is connected to a counterweight 8 such that the counterweight 8 is displaced in the opposite direction when the height of the float 1A is adjusted, and the float 1A is swivelled around the support point F1 at the same time.

This therefore results in a movement of the displacement means 6. As a result of the float 1A and/or solar installation 100A being mechanically connected to the displacement means 6 above and preferably also outside the liquid tank 3A, by a rigid mechanical connection, a movement of the displacement means is therefore transmitted to a swivel movement of the entire float 1A around the support point F1. This thus ensures that the float 1A, and in particular the solar installation 100A mounted on said float, swivels in a particularly robust and simple manner.

The auxiliary float 7 can therefore be pump-controlled or pump-actuated and may preferably also perform a continuous height movement (vertical movement), wherein the auxiliary float 7 is guided along guide rails 72 for this purpose, said guide rails 7 being arranged inside the float tank 81.

In addition, the auxiliary float 7 can be filled with a fluid, especially water, by means of a fluid pipe 9, such that the auxiliary float 7 moves up and down in the vertical direction in the float tank 81 depending on the filling level (ratio of the filled volume to the entire internal volume) of the auxiliary float 7 and/or as a function of the filling level of the float tank 81.

The filling level of the float tank 81 and/or the fluid tank 10 can thus be adjusted by means of the fluid pipe 9.

A filling level inside the auxiliary float 7 can preferably be adjusted to be self-regulating by means of the liquid pump driven by the motor 5 (this pump is preferably mounted on the floor of the fluid tank) as controlled by the radio module 52 operated by the photovoltaic cell 50. In this connection, it is conceivable that a quantity of liquid inside the float tank 81 will remain constant and a filling level inside the float tank 81 will only change as a result of the auxiliary float 7 being immersed in the volume of the float tank 81.

Furthermore, the swivel device 2 comprises a liquid pump 71 by means of which the liquid level in the liquid tank 3A can be adjusted. To this end, the liquid tank 3A is connected fluidically to an additional fluid tank 14 by means of an additional fluid pipe 13. In this case, a filling level in the liquid tank 3A can be adjusted in the same way as when filling or draining the auxiliary float 7. In other words, an additional pump 14 can be arranged in the additional fluid tank for this purpose, said pump pumping the fluid into or out of the liquid tank 3A.

Figure 2A:
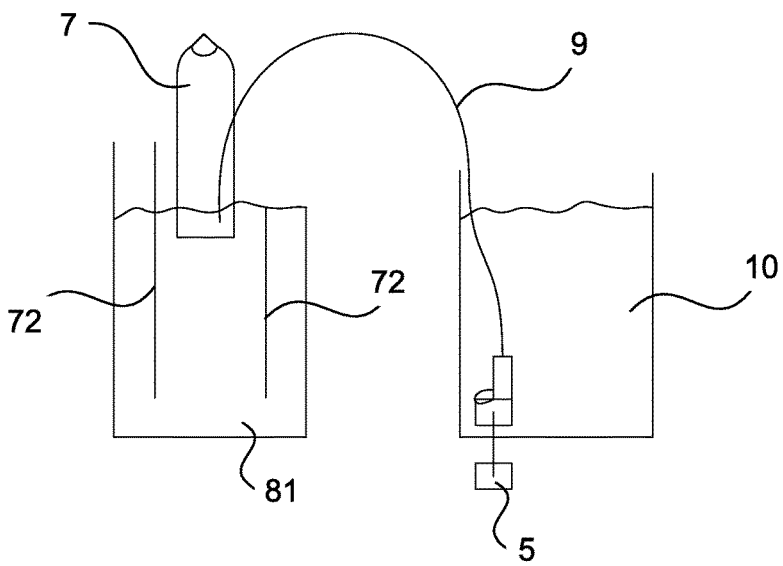
FIGS. 2A to 2C are representations of the course of a day-night swivelling movement of the solar module.
Figure 2B:
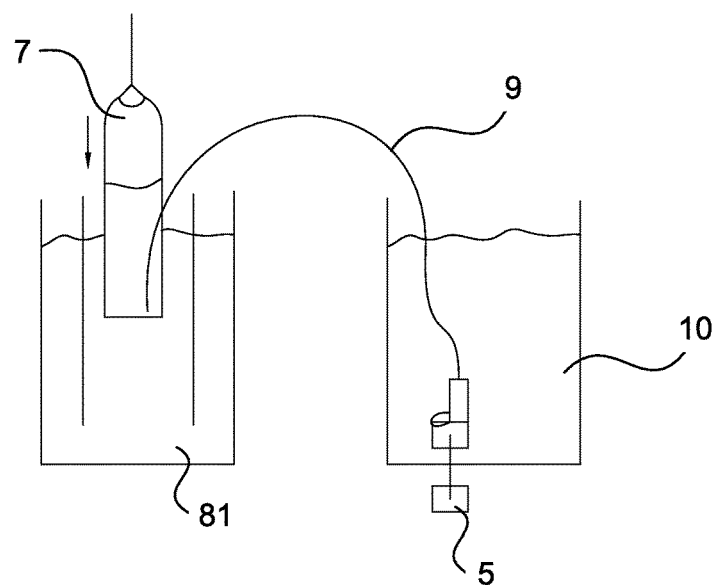
Figure 2C:
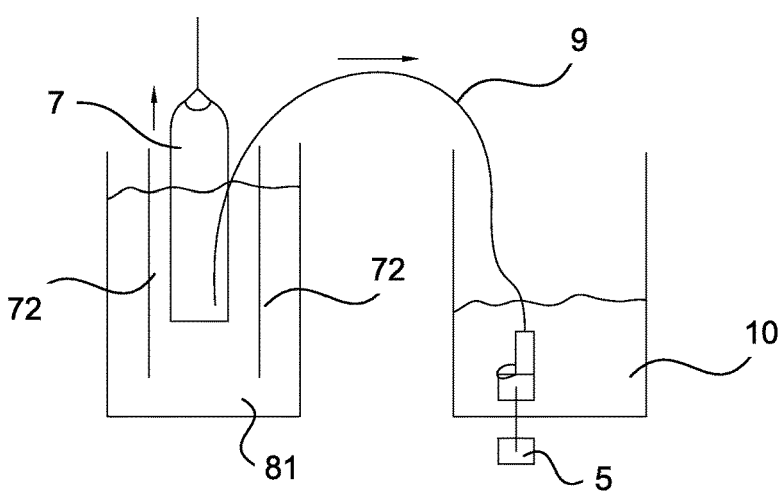

FIGS. 2A to 2C are further schematic perspective views of a swivel control device for the auxiliary float 7 in three different daily phases, shown purely by way of example, i.e. three different filling levels of the float tank 81.

In FIG. 2A, the pump of the motor 5 is switched off in the first instance, resulting in potential energy compensation. This means that the float tank 81 and the fluid tank 10 have substantially the same filling level and filling status, preferably self-regulated. Thus, in FIG. 1A, the float 7 is lifted to its maximum extent out of the float tank 81 and is held laterally in position by retaining rails projecting in part out of the float tank 81 or a retaining cylinder.

This configuration usually applies at night when there is very little light on the photovoltaic cell 50. By lifting the float 7 out of the tank into its highest position, the displacement means 6 also respond, causing the solar installation 100A to swivel to an end stop, for example to the east.

When the sun rises again in the east, the solar installation 100A is fully automatically aligned with the lowest morning position by self-regulation. Additional controllers are not therefore required to align the solar installation back to "zero", or in other words to the east.

FIG. 2B shows a second phase during which the pump of the motor 5 slowly starts up once the sun rises in the east, increasingly responding to the radiated light energy such that the auxiliary float 7 is slowly filled with fluid from the fluid tank 10. As the auxiliary float 7 moves downwards towards the bottom of the float tank 81, the solar installation 100A is also swivelled, thus causing said solar installation 100A to be aligned in an increasingly horizontal direction towards its midday position (with respect to the position of the sun).

However, since the pump of the motor 5 is controlled by the radio module 52, for example, such that a filling level inside the auxiliary float 7 is at least temporarily above a filling level in the float tank 81, the auxiliary float 7 moves further down in the float tank 81. In this process, the pumping capacity of the pump is designed to overcome any opposing fluid pressure, from the float tank 81, for example.

In FIG. 2C the pump of the motor 5 has stopped working. This represents nightfall. Soon after the motor has stopped, the two filling levels inside the auxiliary float 7 and inside the float tank 81 are substantially the same. However, a different height and/or filling level is/are formed due to the pumping capacity of the pump of the motor 5 between the fluid tank 10 and the float tank 81. Therefore, once the pump of the motor 5 is switched off, the fluid level again begins to compensate, for example immediately, thus returning to a situation as shown in FIG. 1A. This therefore leads to fully automatic movement of the solar installation 100A as a function of the position of the sun without the need for any controls and/or actuators.

LIST OF REFERENCE NUMERALS 1 retaining element
1A float
2 swivel device
3A liquid tank
4 pipe system
5 motor
6 displacement means
6A first end of the displacement means 6
6B second end of the displacement means 6
71 liquid pump
8 counterweight
81 float tank
9 fluid pipe
10 fluid tank
10B fluid
13 additional fluid pipe
14 additional fluid tank
30A filling level
31A edge
50 photovoltaic cell
52 radio module
71 guide rail
100 adjustment device
100A solar installation
F1 support point

The invention claimed is:

1. Solar-operated adjustment device for a solar installation, comprising:
    at least one retaining element for fastening one or more solar elements, and a swivel device designed and intended to swivel the retaining element around a support point, wherein the swivel device comprises:
    a first liquid tank,
    a float supporting the retaining element, wherein the float comprises a portion disposed at least in part beneath a filling level of the first liquid tank and the float is supported on the support point disposed on an edge of the open end of the first liquid tank, wherein the float can be swiveled around the support point by means of its buoyancy, wherein the retaining element is supported by the float above the filling level, wherein the swivel device further comprises one or more photovoltaic cells, wherein the one or more photovoltaic cells are electrically connected to and/or in data communication with at least one motor of the adjustment device, and supply said at least one motor with energy and/or data, wherein the at least one motor is operationally connected to control a displacement means that causes the float to swivel around the support point.

2. Solar-operated adjustment device according to claim 1, wherein the at least one motor comprises a test device that determines based on the data whether a level of light sufficient to activate the at least one motor is illuminating the one or more photovoltaic cells, whereupon determination by the test device that the one or more photovoltaic cells are illuminated by the level of light, the at least one motor is activated by the test device so that the at least one motor can control the displacement means to swivel the float around the support point, which ensures that the one or more solar elements follow the position of the sun.

3. Solar-operated adjustment device according to claim 1, wherein the one or more second photovoltaic cells are arranged on a portion of the float that is always above the filling level.

4. Solar-operated adjustment device according to claim 1, wherein the support point can be fixed along the edge by means of at least one fixing means.

5. Solar-operated adjustment device according to claim 1, wherein the displacement means for the swivel device comprises a displacement cable fixed to the float at an engagement point above the support point, wherein a first end of the displacement cable is connected to a height-adjustable auxiliary float disposed in a second liquid tank and a second end of the displacement cable is connected to a counterweight and when the height of the auxiliary float is adjusted, the engagement point is moved from a first position relative to the support point to a second position relative to the support point causing the float to swivel around the support point.

6. Solar-operated adjustment device according to claim 5, wherein the auxiliary float can be filled with and emptied of a fluid by means of a fluid pipe to adjust the height of the auxiliary float, such that the height of the auxiliary float depends on the filling level of the auxiliary float.

7. Solar-operated adjustment device according to claim 6, wherein the fluid pipe is connected fluidically to a third liquid tank, wherein the fluid can be pumped through the fluid pipe from the third liquid tank into the auxiliary float by a pump driven by the motor.

8. Solar-operated adjustment device according to claim 1, wherein the swivel device comprises a defrosting and/or snow removal system which is designed and intended to remove frost and/or snow from at least one surface selected from the group of surfaces consisting of: a surface of the float, a surface of the one or more solar elements, and a surface of the one or more photovoltaic cells.

9. Solar-operated adjustment device according to claim 1, wherein the swivel device comprises at least one liquid pump, by means of which the filling level in the first liquid tank can be adjusted by supplying and discharging liquid through a fluid pipe.

10. Solar-operated adjustment device according to claim 9, wherein the one or more photovoltaic cells are electrically connected to and/or in data communication with the liquid pump.

11. Solar-operated adjustment device according to claim 2, wherein the at least one motor operates as long as the one or more photovoltaic cells generate sufficient electricity to power the at least one motor as a result of being illuminated by al least the level of light.

12. Solar-operated adjustment device according to claim 11, wherein the float swivels around the support point as the Sun moves provided that at least the level of light is illuminating the one or more photovoltaic cells.

* * * * *